Figure 1:
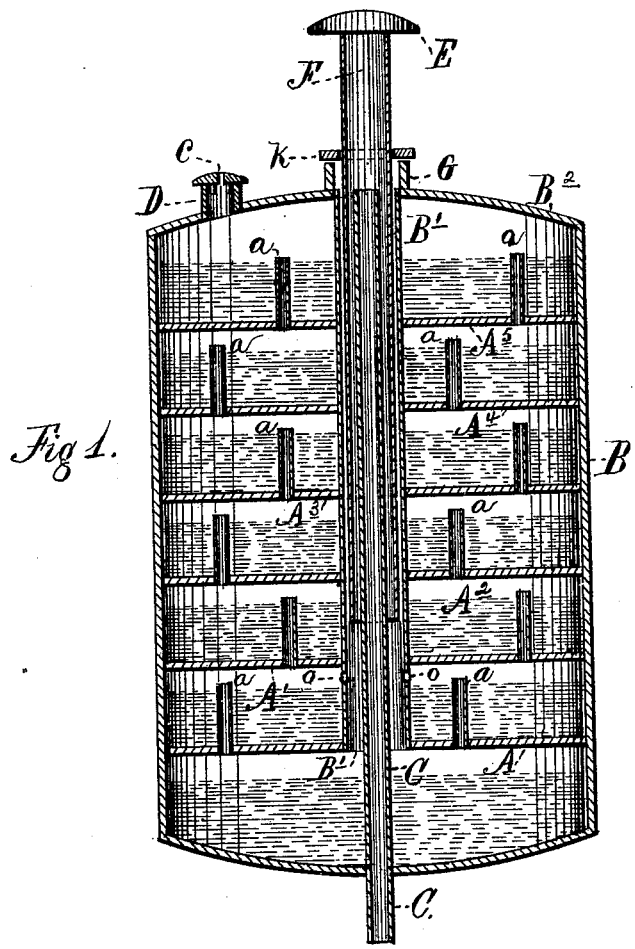

B. F. GREENOUGH.
APPARATUS FOR PRODUCING ILLUMINATING GAS.

No. 189,727. Patented April 17, 1877.

Witnesses:
E. G. Ward.
H. J. Downs

Inventor:
Benjamin F. Greenough.
By A. L. Thomson
Atty.

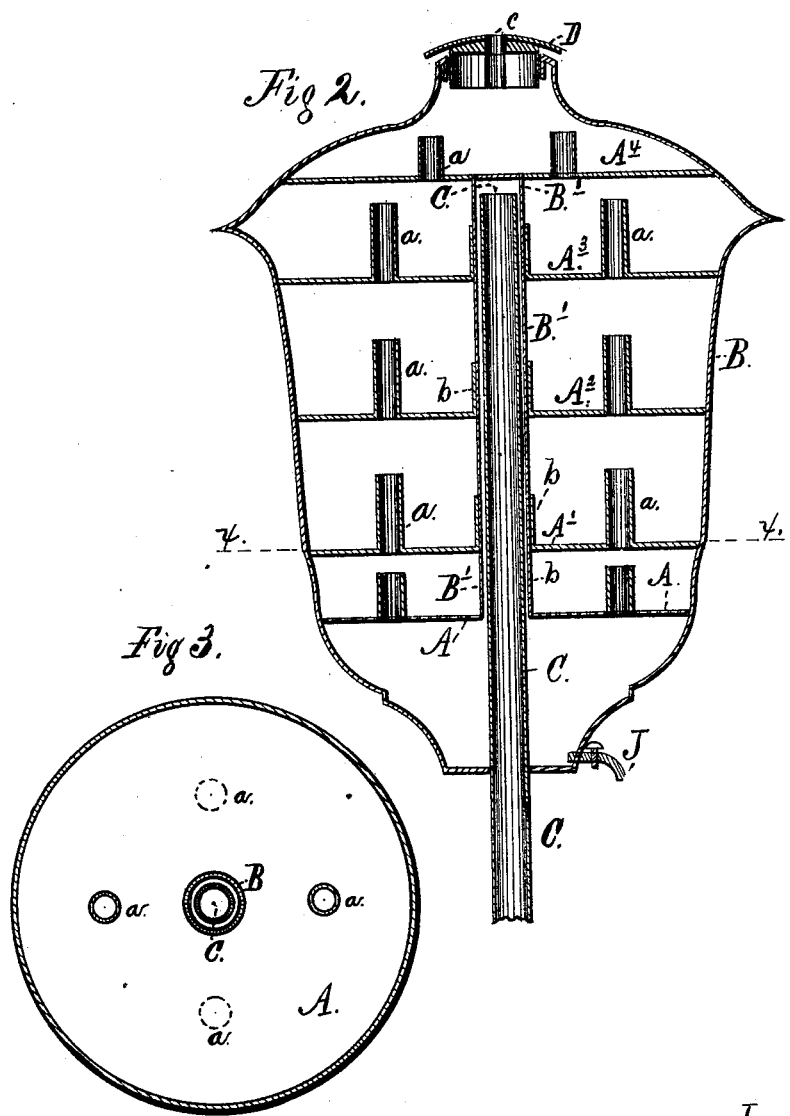

UNITED STATES PATENT OFFICE.

BENJAMIN F. GREENOUGH, OF BROOKLYN, NEW YORK, ASSIGNOR OF ONE-HALF HIS RIGHT TO JACOB J. NICHOLS, OF NEW YORK, N. Y.

IMPROVEMENT IN APPARATUS FOR PRODUCING ILLUMINATING-GAS.

Specification forming part of Letters Patent No. 189,727, dated April 17, 1877; application filed August 29, 1876.

*To all whom it may concern:*

Be it known that I, BENJAMIN F. GREENOUGH, of the city of Brooklyn, in the county of Kings and State of New York, have invented certain new and useful Improvements in Apparatus for Producing Illuminating-Gas, which improvements are fully set forth in the following specification:

This invention relates to that class of devices and apparatus that are used for producing illuminating-gas from the light products of petroleum. It consists in a novel arrangement, in a tank or can, of suitable evaporating-pans, with or without an absorbent material, in combination with a peculiar siphon arrangement of gas-pipes for drawing the gas from the generating-tank containing the liquid from which the gas is formed, and conducting it to the burner or burners located below the 'gas-generator, the construction, application, and operation of all of which will be herein fully pointed out and described.

In the drawings, which form an essential part of this specification, Figure 1 is a vertical sectional elevation of a gas-generating tank or can in which is fully embodied my invention. Fig. 2 is a modification of the same. Fig. 3 is a cross-section taken on the line $x\ x$ in Fig. 2.

Similar letters of reference in the various figures of the drawings will indicate corresponding parts.

My present device is an apparatus for producing an illluminating gas from the light products of petroleum, and for furnishing the apparatus in a portable form in such a manner that it can be used and utilized to supply one or any number of burners.

The portable apparatus consists of a small tank or can, of any desired shape, to contain the liquid from which the gas is generated.

B is the tank or can, and, when used for an ordinary portable or hanging light to supply one or two burners, is constructed as follows: No matter whether the form of the tank or can be round or angular, it should be large enough to hold about a gallon of the gas-producing liquid. This can may be constructed from sheet metal in the manner usual in such cases, and its exterior may be ornamented in such style as taste or fancy may call for. Within this tank or can are placed a series of evaporating-pans, A, $A^1$, $A^2$, $A^3$, $A^4$, and $A^5$; but the number may be increased or diminished at will, as the case may call for. These pans are made of such size as to fit the can, and are usually about one inch in depth. In each pan, near the center, are inserted two or more small tubes, $a\ a$. Their height being a trifle less than the depths of the pans, their position is such that they will not be directly under the tubes in the pan above, so that any liquid passing through them will drop into the pan below.

These evaporating-pans are constructed from sheet metal, and are soldered within the can to its sides, and are arranged one above the other, about two inches apart. The space in between the pans may be filled with an absorbent material, such as "excelsior," cotton-waste, lamp-wicking, or any similar material that will take up the liquid and hold it in absorption; but this, however, is not absolutely necessary, and may be dispensed with.

At the center of the can a tube, $B^1$, is introduced, which, at its apex, is secured to and passes through the top $B^2$ of the vessel. It extends downward through the various evaporating-pans $A^5$ to pan A, through which it is passed, and secured by soldering. All of these evaporating-pans are securely soldered to this tube $B^1$, as shown in Fig. 1; or they each may be provided with a tube, $b$, at their center, as shown in Fig. 2, through which tube $B^1$ passes, and is soldered thereto, the object being to arrange each pan so that it will hold liquid independently of the others.

An outlet tube or pipe, C, which conducts the gas from the can to the burners, where it is consumed, is inserted centrally within the tube $B^1$, reaching a position flush with its top, as plainly shown in Fig. 1, and it is secured in place and held by passing through the base of the can, to which it is securely soldered, or otherwise fastened, by such mechanical device as is generally used in such cases. F is an adjustable detached tube, of slightly smaller diameter than tube $B^1$. It is open at its base, and closed at its apex by a cap, E. This tube is inserted within the tube $B^1$, which it fits and encircles the tube C. It is intended to slide freely within tube B¹, and to leave a chamber between it and tube C, as will be readily seen by referring to Fig. 1. This arrangement of pipes F, B¹, and C forms an adjustable siphon, through which the gas is drawn, and conducted by pipe C to the burners, as will presently be more fully described. The cover B² of the can is provided with a neck, G, upon which the cap E of the tube F rests when it is in its normal position.

An elastic packing-ring, $k$, surrounds the tube F, and is moved up and down thereon as the position of the tube is changed. It rests upon the top of the neck G, and serves to hold the tube F in any position in which it may be set. This elastic packing might be attached to the top of the neck G, and the tube F fitted thereto; but it is apparent that either arrangement will answer the purpose.

In the cover B² of the can is formed an opening for the introduction therein of the liquid from which the gas is to be formed. It is closed by means of a screw-plug, D, in the center of which is formed a small orifice, $c$, which permits the entry of air into the interior of the can. This orifice may be closed, when the apparatus is not in use, by means of a suitable plug.

The practical operation of the apparatus, as shown in Fig. 1, is as follows: The gas-producing liquid is poured in at the opening in the top of the can, and is retained in pan A⁵ until reaches the top of the tubes $a\ a$. It then flows through such tubes into the pan below until all the pans are full, including the chamber below the pan A, as is shown distinctly in the drawing. When filled, it will be seen that each of the pans presents an evaporating-surface, which may be increased by the employment of an absorbent material, as hereinbefore alluded to.

After the tank or can is filled it is suspended from the wall or ceiling, and the air admitted by the orifice $c$, arranged for that purpose. The air, on entering, strikes the surface of the liquid in the top pan and immediately forms a gas, which, by its own gravity at once falls through the tubes down into the pan below, and to each successive pan, until it reaches the pit at the bottom of the can below pan A. It then rises up through the tube F, passing through the chamber between it and the tube C to the top of tube C; thence it falls through the tube C, and is thereby conducted to the burner, which may be attached to an elongation of pipe C, or by a pipe connected thereto at any distance from the gas-generator. This is the operation in case the chamber in the can below pan A is only partially filled with liquid, in which case the adjustable tube F is pushed down until its cap E rests upon the neck G, its base reaching to the base of the tube B'. Should an excess of liquid be introduced into the vessel, and the chamber below pan A become full so as to close the base of the tube F, the apparatus would fail to produce any gas. In such an event the tube F would be raised to the position as shown, and the gas that is formed in the chamber between pans A and A¹, would pass into the interior of the tube B' through the openings $o\ o$ formed in the tube for that purpose, and below the base of tube F, through which it would exit, as in the case before described. When the excess of liquid in the lower chamber has been transformed into gas, the tube F would be dropped to its normal position, closing the openings $o\ o$ and drawing the gas from the chamber in the base of the can, as first described. The tube B' may be provided with openings $o\ o$ between each of the pans, and the tube F adjusted to any position in case the excess of liquid should fill the lower pans as well as the chamber in the base of the can. This peculiar arrangement of tubes, forming an adjustable siphon-conductor, precludes any and all possibility of any liquid reaching the burners, and this siphon principle is the important element involved in my invention.

In the modification of my gas apparatus show in Fig. 2 the siphon arrangement is not adjustable, the tube B' being closed at its apex and attached to the top pan, while the base is secured as in the first instance. The movable tube F is omitted entirely, while the tube C is inserted through the base of the can and carried centrally through the interior of and nearly to the apex of the tube B'. In this case the gas is drawn from the chamber below pan A up through the tube B', falls through the tube C, and therefrom to the burners. Should the lower chamber be filled with liquid so as to close the base of tube B', and prevent the operation of the apparatus, the remedy is found by drawing off the excess of liquid through the faucet J, inserted in the base of the can for that purpose. While I prefer the adjustable siphon arrangement, it is obvious that a siphon constructed and applied as shown in Fig. 2 would perform the work as described.

It is proper to here remark that the liquid I use in this apparatus is the light products of petroleum chemically treated by a peculiar process in such a manner that the liquid itself and the gas evolved therefrom are perfectly non-explosive; neither will the liquid evaporate from exposure to the air. This chemical process of treatment will be made the subject of a future application for a patent therefor.

It is obvious that a large gas-generator constructed upon the plan as hereinbefore fully set forth, and placed at the top of a building, and connected with the ordinary gas-pipes, would furnish gas to any number of burners, and it is my intention to so apply my invention.

Having thus fully described my invention, what I claim, and desire to secure by Letters Patent of the United States, is—

1. The combination of the can B, provided with a series of evaporating-pans, A A$^1$, carrying a gas-producing liquid, fixed tube B$^1$, sliding tube F, and discharge-tube C, forming an adjustable siphon by means of which gas is drawn from the base of the can, carried above the level of the liquid, and thence to a burner, in the manner and for the purposes herein shown and set forth.

2. The combination of the can B, provided with a series of evaporating-pans, A A$^1$, carrying a gas-producing liquid, central tube B$^1$, encircling fixed tube C, and forming a siphon, by means of which gas is drawn from a chamber in the base of the can and conveyed to a burner, in the manner and for the purposes as herein shown and set forth.

BENJAMIN F. GREENOUGH.

In presence of—
 A. L. MUNSON,
 E. G. WARD.